(12) United States Patent
Bulan et al.

(10) Patent No.: US 8,744,132 B2
(45) Date of Patent: Jun. 3, 2014

(54) VIDEO-BASED METHOD FOR DETECTING PARKING BOUNDARY VIOLATIONS

(76) Inventors: Orhan Bulan, Greece, NY (US); Edgar A. Bernal, Webster, NY (US); Robert P. Loce, Webster, NY (US); Yao Rong Wang, Webster, NY (US); Zhigang Fan, Webster, NY (US)

(*) Notice: Subject to any disclaimer, the term of this patent is extended or adjusted under 35 U.S.C. 154(b) by 178 days.

(21) Appl. No.: 13/461,266

(22) Filed: May 1, 2012

(65) Prior Publication Data
US 2013/0266188 A1   Oct. 10, 2013

Related U.S. Application Data

(63) Continuation-in-part of application No. 13/441,269, filed on Apr. 6, 2012, and a continuation-in-part of application No. 13/441,253, filed on Apr. 6, 2012.

(51) Int. Cl.
*G06K 9/00* (2006.01)
*G08G 1/16* (2006.01)

(52) U.S. Cl.
USPC ............................ 382/104; 382/291; 340/903

(58) Field of Classification Search
CPC .................................. G06K 9/00; G08G 1/16
USPC ......... 382/100, 103–107, 155, 162, 168, 173, 382/181, 199, 209, 232, 254, 274, 276, 382/286–294, 305, 312; 348/169, 148; 340/932.2, 937, 432
See application file for complete search history.

(56) References Cited

U.S. PATENT DOCUMENTS

| 6,081,206 | A  | * | 6/2000  | Kielland ....................... 340/937 |
| 6,285,279 | B1 | * | 9/2001  | Yamazaki .................... 340/432 |
| 6,285,297 | B1 |   | 9/2001  | Ball |
| 6,747,687 | B1 | * | 6/2004  | Alves ............................ 348/148 |
| 8,120,513 | B2 | * | 2/2012  | Ioli ............................ 340/932.2 |
| 2003/0076417 | A1 | * | 4/2003  | Thomas et al. ............... 348/169 |
| 2012/0007983 | A1 | * | 1/2012  | Welch .......................... 348/148 |
| 2012/0148105 | A1 |   | 6/2012  | Burry et al. |
| 2012/0263352 | A1 | * | 10/2012 | Fan et al. ..................... 382/105 |
| 2013/0028481 | A1 |   | 1/2013  | Wu |

OTHER PUBLICATIONS http://www.nytimes.com/2011/09/19/nyregion/uprooting-the-old-familiar-parking-meter.html?_4=1&goback+%2Egde_153603_member_72027013, Dated Sep. 18, 2011; 3 pgs.
www.streetsmarttechnology.com, retrieved from the Internet Aug. 6, 2012, 10 pgs.
Wren et al., "Pfinder: Real-Time Tracking of the Human Body", in IEEE Transactions on Pattern Analysis and Machine Intelligence, Jul. 1997, vol. 19, No. 7, pp. 780-785.
Friedman et al., "Image segmentation in video sequences: A probabilistic approach", in Proc. of the Thirteenth Conference on Uncertainty in Artificial Intelligence (UAI), Aug. 1-3, 1997.

(Continued)

*Primary Examiner* — Seyed Azarian
(74) *Attorney, Agent, or Firm* — Fay Sharpe LLP

(57) ABSTRACT

A method and a system for determining a parking boundary violation includes receiving video data from a sequence of frames taken from an image capture device monitoring a parking area including at least a single parking space. A boundary is determined for defining at least one parking space in the parking area. A vehicle is detected in the parking area. A determination is made whether the detected vehicle is violating a parking regulation based on a position and size of the vehicle within the boundary.

20 Claims, 8 Drawing Sheets

(56) References Cited

OTHER PUBLICATIONS

Stauffer et al., "Adaptive background mixture models for real-time tracking", in Proc. of the 1999 Conference on Computer Vision and Pattern Recognition (CVPR '99), pp. 2246-2252, 1999.
Makarov et al., "Intrusion detection using extraction of moving edges", in 12$^{th}$ IAPR Int. Conf. on Pattern Recognition, vol. 1 of IAPR, pp. 804-807, IEEE Press, 1994.
Paragious et al., "Detection and location of moving objects using deterministic relaxation algorithms", in ICPR, No. 13, pp. 201-286, Vienna, Austria, Aug. 1996.
http://www.alibaba.com/product-gs/373281312/Ultrasonic_Parking_Sensor.html, retrieved from the internet Mar. 28, 2012; 4 pgs.
Oliver et al., "A Bayesian Computer Vision System for Modeling Human Interactions", IEEE Transactions on PAMI, pp. 831-843.
Lo et al., "Automatic congestion detection system for underground platforms,"Proc. of 2001 Int Symp. on Intell. Multimedia, Video and Speech Processing, pp. 158-161.
Prati et al., "Shadow Detection Algorithms for Traffic Flow Analysis: a Comparative Study", In Proc. IEEE Intelligent Transportation Systems, 2001.
Cucchiara et al., "Improving Shadow Suppression in Moving Object Detection with HSV Color Information", Proc. of IEEE Intelligent Transportation Systems, 2001.
Zhang, "A flexible new technique for camera calibration", IEEE Trans. on Pattern Analysis and Machine Intelligence, vol. 22 (11), pp. 1330-1334 (2000).
http://www.nyc.gov/html/dof/html/parking/park_tickets_violations.shtml, retrieved from the internet Aug. 6, 2012.
http://www.sanjoseca.gov/transportation/onstreet_regulations.htm, retrieved from the internet Aug. 6, 2012.
http://www.portlandoregon.gov/transportation/article/59926, retrieved from the internet Aug. 6, 2012.
http://vancouver.ca/bylaws/2849c.pdf, Street and Traffic By-Law No. 2849, Oct. 18, 2011.
http://parkitnyc.com/parking-nyc/nyc-parking-tickets/, retrieved from the internet Aug. 6, 2012.
Agarwal et al., "Learning to detect objects in images via a sparse, part-based representation", Pattern Analysis and Machine Intelligence, IEEE Transactions on, vol. 26, No. 11, pp. 1475-1490, Nov. 2004.
Tsai et al., "Vehicle Detection Using Normalized Color and Edge Map," Image Processing, IEEE Transactions on, vol. 16, No. 3, pp. 850-864, Mar. 2007.
Duncan, et al., "Temporal edges: The detection of motion and the computation of optical flow", in Proc. Second Int. Conf. Comput. Vision, Tampa, FL, Dec. 1988, pp. 374-382.
Comaniciu et al., "Real-time tracking of non-rigid objects using mean shift", in: Proceedings of IEEE Conference on Computer Vision and Pattern Recognition (CVPR'00), South Carolina, 2000, pp. 142-149.
Kass et al., "Snakes: Active Contour Models", Int'l Journal of Computer Vision, pp. 321,331, 1988.
Dickmanns et al., "Dynamic monocular machine vision", Machine Vision and Applications 1: 1223-240, 1988.
Gustafsson et al., "Particle Filters for Positioning, Navigation and Tracking", IEEE Transactions on Signal Processing, 2002.
http://en.wikipedia.org/wiki/Hough_transform, "Hough transform", retrieved from the internet Aug. 6, 2012, last modified Aug. 1, 2012.
Ma et al., "Edge-based rich representation for vehicle classification", Proc. of IEEE Computer Vision (ICCV), 2005.

\* cited by examiner

VIDEO-BASED METHOD FOR DETECTING PARKING BOUNDARY VIOLATIONS

CROSS REFERENCE TO RELATED PATENTS AND APPLICATIONS

This application claims the priority, as a continuation-in-part, of co-pending U.S. application Ser. No. 13/441,269, filed Apr. 6, 2012 and entitled "A System and Method for Available Parking Space Estimation For Multispace On-Street Parking" by Orhan Bulan et al.; and U.S. application Ser. No. 13/441,253, filed Apr. 6, 2012 and entitled "Video-Based System And Method For Detecting Exclusion Zone Infractions" by Orhan Bulan et al., the disclosures of each of which are incorporated herein by reference in their entireties.

BACKGROUND

The present disclosure relates to a video-based method and system for computing positions of parked vehicles relative to boundaries that designate parking spaces and for determining parking violations based on the positions. The disclosure finds application in parking space management and enforcement. However, it is appreciated that the present exemplary embodiments are also amendable to other like applications.

Municipalities regulate parking in certain areas for public safety and ease of access reasons. One example regulation prohibits parking beyond the boundaries of a marked parking space unless the vehicle is subject to an exception. An exception can include a vehicle having a length that is too long to fit between the boundaries defining one space.

One area that is regulated by a parking boundary code can include on-street parking lanes. These areas can be divided into stalls for parking space and transportation management purposes. FIG. 1 illustrates an on-street single-space parking scenario, also known as stall-based parking, in which each parking space is defined in a parking area by clear boundaries. The parking spaces are typically marked by lines (shown in phantom) that are painted on the road surface to designate one parking space per vehicle. Single space parking can be regulated in populated regions with limited parking availability. Therefore, infractions of parking boundary regulations can result in substantial fines for the violators and can generate significant revenue for municipalities.

Traditionally, a detection of parking boundary violations is performed by traffic law enforcement officers. However, this method is costly in labor required for inspection and in fines lost from undetected violations. In an effort to reduce costs and improve efficiency, municipalities are exploring the use of new technologies for automating traffic and parking law enforcement.

One technology that has been used to automate traffic and parking management includes sensor-based methods that use sensors that output a binary signal when a vehicle is detected in a parking area. However, a high cost for installation and maintenance is associated with the sensors. Video-based technology is also being explored in other parking enforcement and management areas, such as for monitoring short term parking and for determining parking space availability. However, the video-based technology has not been extended to monitoring vehicle positions relative to parking space boundaries for enforcing parking boundary regulations.

There is a need for a system and a method that uses video data received by a video-sensor for determining an occurrence of a violation.

CROSS REFERENCE TO RELATED PATENTS AND APPLICATIONS

This application is related to co-pending application Ser. No. 13/461,221, filed herewith, entitled "A Video-Based Method for Parking Angle Violation Detection" by Orhan Bulan et al., the application of which is incorporated herein in its entirety.

BRIEF DESCRIPTION

Embodiments of the present disclosure relate to a method and a system for determining a parking boundary violation. Video data is received from a sequence of frames taken from an image capture device monitoring a parking area including at least a single parking space. A boundary is determined for defining at least one parking space in the parking area. A vehicle is detected in the parking area. A determination is made whether the detected vehicle is violating a parking regulation based on a position and size of the vehicle within the boundary.

DETAILED DESCRIPTION

The present disclosure relates to a video-based method and system for determining parking boundary violations. The system is adapted to compute positions and sizes of parked vehicles relative to boundaries that designate parking spaces and determine parking violations based on the computed positions and sizes. A video camera is used to monitor parking spaces. The acquired video can be processed locally or transferred to a central processor where it is analyzed to detect vehicles that are parked beyond the designated markings defining a single parking space. This information is reported to entities that are authorized to enforce parking boundary regulations.

Figure 1:
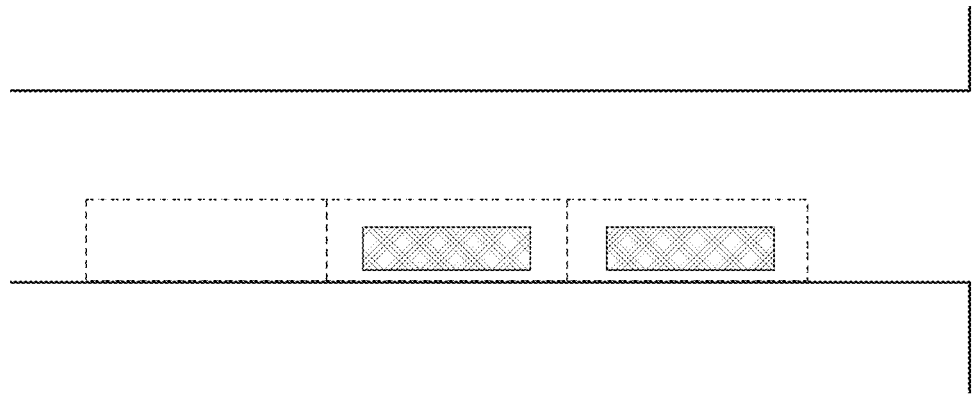
FIG. 1 shows a single-space parking area including designated spaces.
Figure 2:
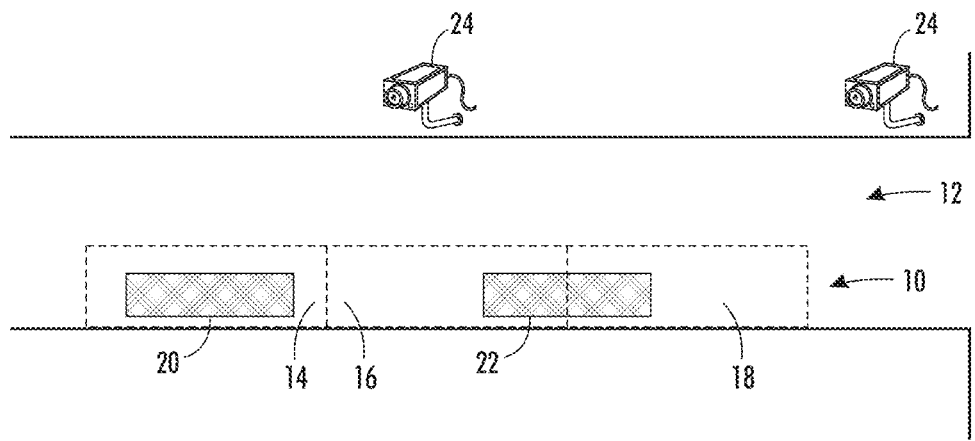
FIG. 2 shows an example scenario for detecting a parking boundary violation in the parking area of FIG. 1.

FIG. 2 shows an example scenario for detecting a parking boundary violation in the parking area. An on-street parking area 10 extends along a curb on a street 12. The parking area 10 is more specifically a parking lane that is divided into a number of single spaces 14-18 each designated by markings (shown in phantom) on the street. Two vehicles 20, 22 are parked along in the parking area 10. A first vehicle 20 is properly parked inside the boundaries of space 14. A second vehicle 22 is parked beyond the boundaries of space 16 and into an adjacent space 18, thus occupying two spaces 16, 18. Video cameras 24 are installed across the street for continuously monitoring the parking area 10. The cameras 24 provide video feed to a processor of the system, which analyzes the video data to determine whether the vehicles 20, 22 are violating the parking boundary regulation. Because the second vehicle 22 is determined to be short enough to fit in one space 16, the system indicates that it is violating the regulation.

Figure 3:
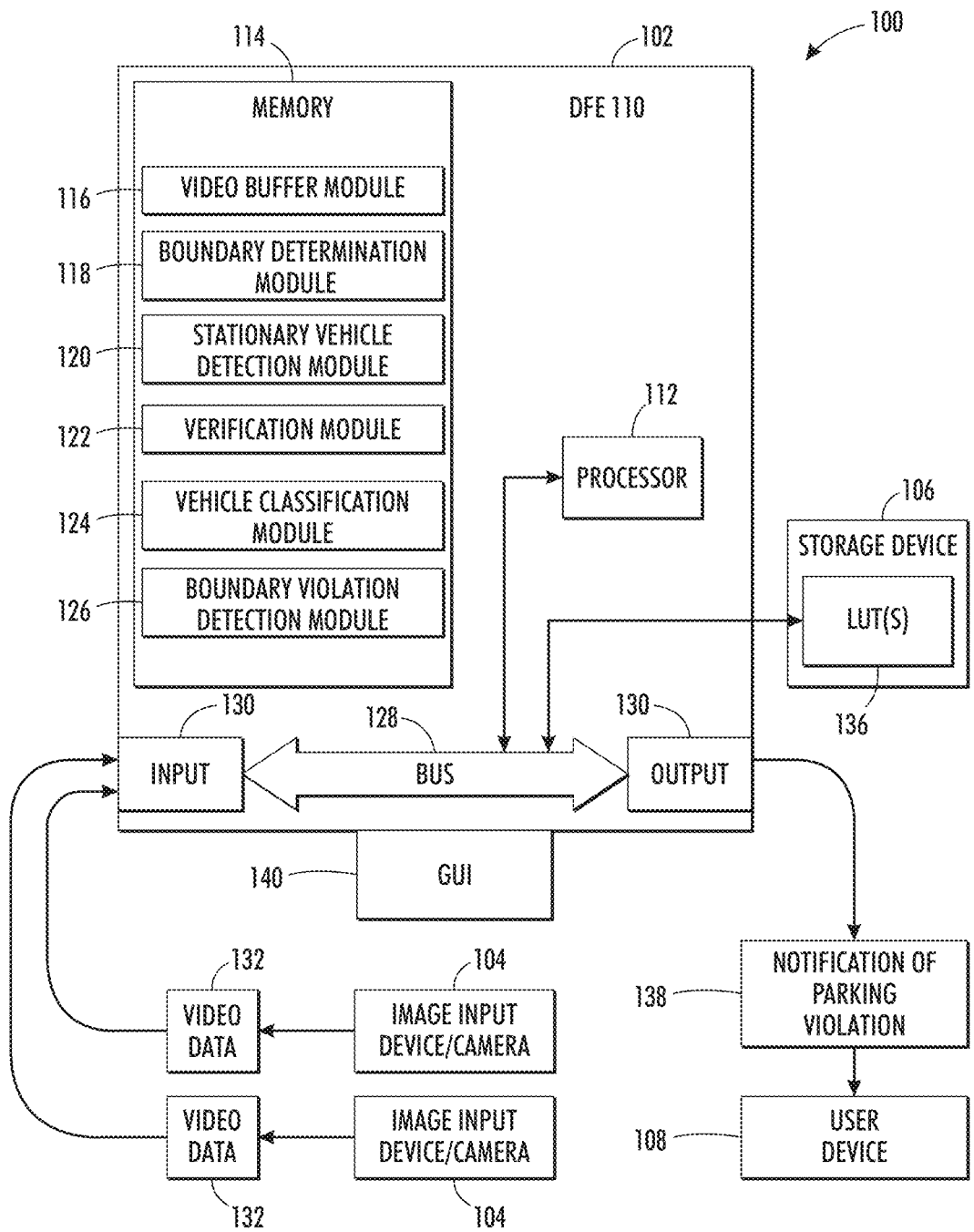
FIG. 3 is a schematic illustration of a parking boundary violation detection system according to one embodiment.

FIG. 3 is a schematic illustration of a parking boundary violation detection system 100 in one exemplary embodiment. The system includes a detection device 102, an image capture device 104, and a storage device 106, which may be linked together by communication links, referred to herein as a network. In one embodiment, the system 100 may be in further communication with a user device 108. These components are described in greater detail below.

The detection device 102 illustrated in FIG. 3 includes a controller 110 that is part of or associated with the detection device 102. The exemplary controller 110 is adapted for controlling an analysis of video data received by the system 100. The controller 110 includes a processor 112, which controls the overall operation of the detection device 102 by execution of processing instructions that are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor, in addition to controlling the operation of the detection device 102, executes instructions stored in memory 114 for performing the parts of the method outlined in FIGS. 4-6. In some embodiments, the processor 112 and memory 114 may be combined in a single chip.

The detection device 102 may be embodied in a networked device, such as the image capture device 104, although it is also contemplated that the detection device 102 may be located elsewhere on a network to which the system 100 is connected, such as on a central server, a networked computer, or the like, or distributed throughout the network or otherwise accessible thereto. The vehicle detection and violation determination phases disclosed herein are performed by the processor 112 according to the instructions contained in the memory 114. In particular, the memory 114 stores a video buffering module 116, which captures video of a select parking area; a boundary determination module 118, which determines boundaries of parking stalls and/or single spaces in the captured video; a stationary vehicle detection module 120, which detects vehicles that are in the parking area of interest; a verification module 122, which verifies that the detected vehicles are parked in the area of interest; a vehicle classification module 124, which classifies the detected vehicle as satisfying or not satisfying an exception condition by, for example, vehicle length; and, a boundary violation detection module 126, which determines whether the vehicle classified under a select classification is violating a boundary regulation and triggers a notification to enforcement authorities when a violation is determined. Embodiments are contemplated wherein these instructions can be stored in a single module or as multiple modules embodied in the different devices. The modules 116-126 will be later described with reference to the exemplary method.

The software modules as used herein, are intended to encompass any collection or set of instructions executable by the detection device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the detection device 102 may be all connected by a bus 128.

With continued reference to FIG. 3, the detection device 102 also includes one or more communication interfaces 130, such as network interfaces, for communicating with external devices. The communication interfaces 130 may include, for example, a modem, a router, a cable, and and/or Ethernet port, etc. The communication interfaces 130 are adapted to receive video and/or image data 132 as input.

The detection device 102 may include one or more special purpose or general purpose computing devices, such as a server computer or digital front end (DFE), or any other computing device capable of executing instructions for performing the exemplary method.

FIG. 3 further illustrates the detection device 102 connected to an image source 104 for inputting and/or receiving the video data and/or image data (hereinafter collectively referred to as "video data") in electronic format. The image source 104 may include an image capture device, such as a camera. The image source 104 can include one or more surveillance cameras that capture video data from the parking area of interest. The number of cameras may vary depending on a length and location of the area being monitored. It is contemplated that the combined field of view of multiple cameras typically comprehends all the single parking spaces being monitored and enforced. For performing the method at night in parking areas without external sources of illumination, the cameras 104 can include near infrared (NIR) capabilities at the low-end portion of a near-infrared spectrum (700 nm-1000 nm).

In one embodiment, the image source 104 can be a device adapted to relay and/or transmit the video captured by the camera to the detection device 102. In another embodiment, the video data 132 may be input from any suitable source, such as a workstation, a database, a memory storage device, such as a disk, or the like. The image source 104 is in communication with the controller 110 containing the processor 112 and memories 114.

With continued reference to FIG. 3, the system 100 includes a storage device 106 that is part of or in communication with the detection device 102. In a contemplated embodiment, the detection device 102 can be in communication with a server (not shown) that includes a processing device and memory, such as storage device 106, or has access to a storage device 106, for storing look-up tables (LUTs) 136 that associates area-specific parking regulations, conditions, and exceptions with each particular camera used by the system 100.

With continued reference to FIG. 3, the video data 132 undergoes processing by the detection device 102 to output notice of a parking boundary violation 138 to an operator in a suitable form on a graphic user interface (GUI) 140 or to a user device 108, such as a computer belonging to an enforcement authority. The user device 108 can include a computer at a dispatch center, a smart phone belonging to an enforcement driver in transit or to a vehicle computer and/or GPS system that is in communication with the detection device 102, although there is no limitation made herein to these examples. The user device 108 can further include a central server and repository that automatically charges an account associated with a registrant of the violating vehicle, automatically issues a ticket to the registrant, and/or automatically provides the registrant's information to the authority. In another contemplated embodiment, the user-device 108 can belong to a driver of the vehicle that is violating the parking boundary regulation. In this manner, the driver can be put on notice that the vehicle should be moved. The GUI 140 can include a display, for displaying information, such as the location of the infraction and information regarding the vehicle violating the parking boundary violation, to users, and a user input device, such as a keyboard or touch or writable screen, for receiving instructions as input, and/or a cursor control device, such as a mouse, trackball, or the like, for communicating user input information and command selections to the processor 112.

Figure 4:
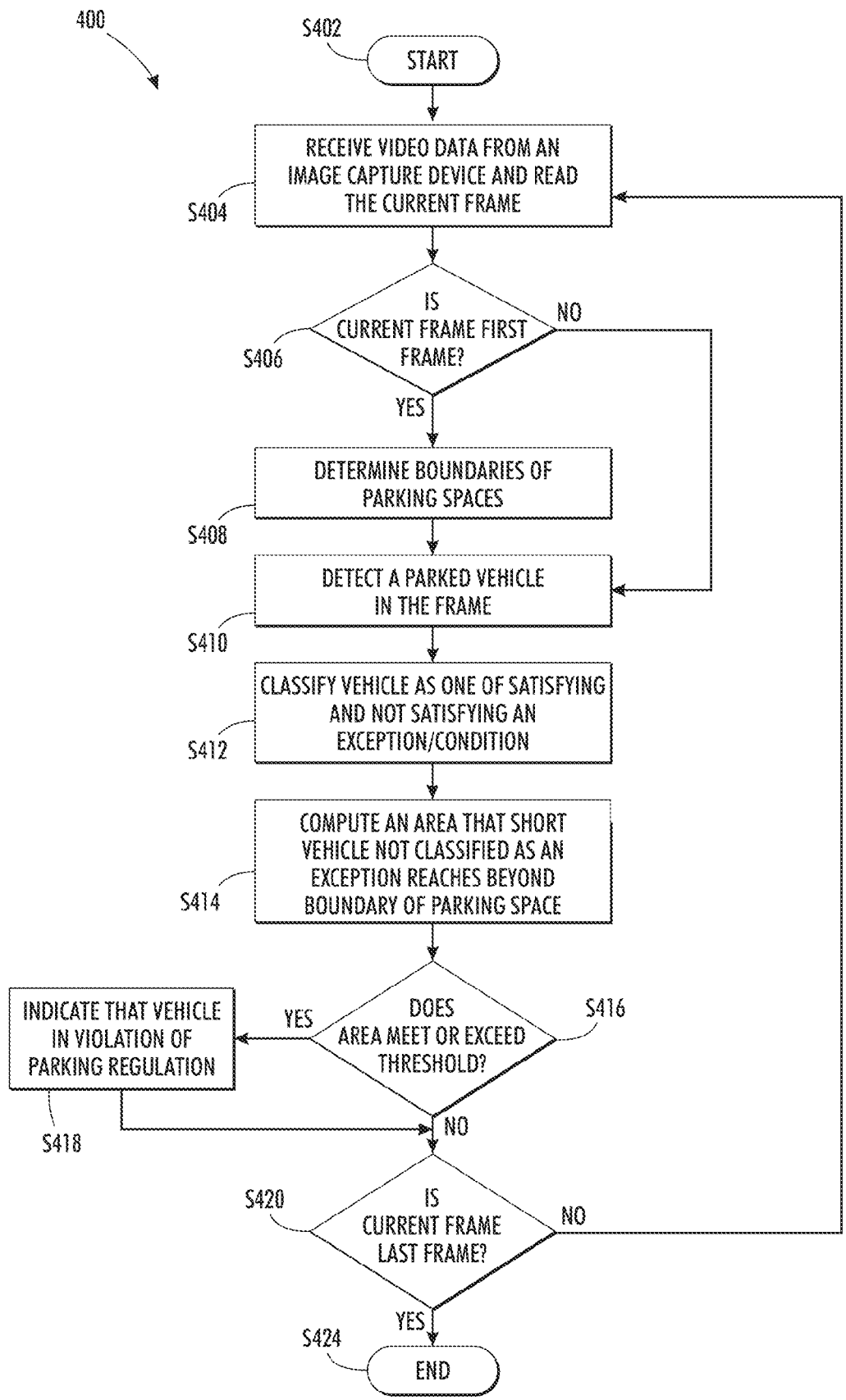
FIG. 4 is a flowchart describing an overview of a method for determining a parking boundary violation.

FIG. 4 is a flowchart describing an overview of a method 400 for determining a parking boundary violation. The method starts at S402. The system receives video data from an image capture device that is monitoring a parking area and reads a current frame at S404. The system determines whether the current frame is an initial frame to be processed in the video sequence at S406. In response to the current frame being the initial frame (YES at S406), the frame is processed for determining boundaries of parking spaces in the parking area at S408. In response to the current frame not being the initial frame (NO at S406), the boundaries are already known and the current frame is processed to detect whether a parked vehicle is captured in the frame at S410. A detected vehicle is classified as one of satisfying and not satisfying an exception and/or condition to a parking regulation at S412. Vehicles that are classified as not satisfying the exception/condition are processed to determine an area that the detected vehicle reaches beyond the determined boundary of the parking space at S414. The area is compared to a threshold at S416. In response to the threshold being met (YES at S416), the system indicates that the detected vehicle is in violation of a parking regulation at S418. Otherwise, the system determines whether the current frame is the last frame in the video sequence at S420. In response to the current frame not being the last frame (NO at S420), the method returns to S404 and repeats for the next frame in the sequence. In response to the current frame being the last frame (YES at S420), the method ends at S424.

Figure 5:
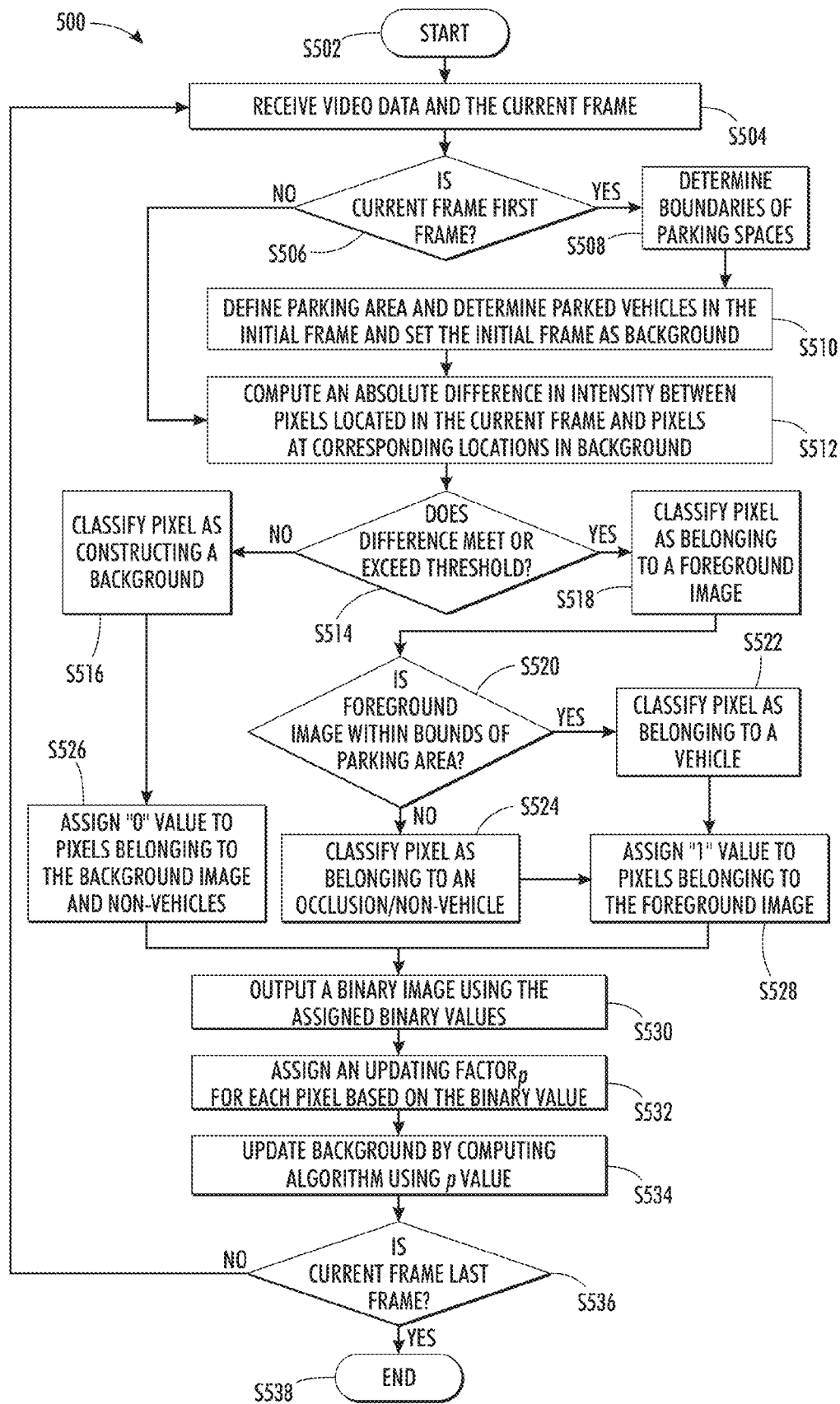
FIG. 5 is a flowchart describing a process for detecting a vehicle in a single-space parking area.

FIG. 5 is a flowchart describing a method 500 for detecting a vehicle in a parking area. The method starts at S502. The video buffer module 116 receives video data from a sequence of frames taken from the image capture device 104 monitoring the parking area at S504. The system can process each frame in the sequence. Accordingly, the system determines whether the current frame is the initial frame of the sequence at S506. In response to the current frame not being the initial frame in the sequence (NO at S506), the system transmits the video data to the stationary vehicle detection module 120 for updating a background (beginning at S512). In response to the current frame being the initial frame in the sequence (YES at S506), the system provides the video data to the boundary determination module 118.

The boundary determination module 118 determines boundaries of parking spaces in the parking area at 508. The parking area that is selected for being monitored includes multiple parking spaces that are each specified in some manner, such as, for example, by markings painted on the road surface. The location of the boundaries on the image plane can depend on a geometric configuration of the specific camera 104 set-up. In one embodiment, the boundaries can be specified manually on the image plane at the time the camera is installed and/or calibrated. For example, each single parking space can be defined by generating a map associating three-dimensional coordinates in the actual area to two-dimensional pixel coordinates of the parking area in the video data at S508. The actual coordinates can be input into the system by an administrator or operator. In another embodiment, the boundaries can be estimated automatically. The boundary determination module 118 can detect a curb. In one example, the boundary determination module 118 can search for the longest line in the image plane, which generally represents the curb as it extends adjacent to an on-street parking lane that is being monitored. The boundary determination module 118 can also detect markings and/or lines that are present on the road surface. The module 118 can define a virtual closed loop using the detected curb and markings. In one embodiment, the module 118 can define the virtual closed loop by first detecting edges on a frame and then performing a Hough transform on the detected edges. In parking areas that do not include markings adapted for forming a closed loop, the process can detect the available markings and/or reference features and then round-out the results to estimate the virtual closed-loop.

Each closed loop is set as a parking space (stall) in the initial frame and will be used in the analyses of the initial frame and each subsequent frame. However, the process can be performed on several frames when there is no motion detected in the scene before initializing the algorithm. In this manner, the boundaries for all parking stalls within the camera view can be detected without interference from vehicles and objects, such as pedestrians. There is no limitation made herein to the process used for determining the boundaries in the parking spaces. Any process understood in the art for defining a select region in an image plane can be used. After the boundary determination module 118 determines the boundaries, it provides the stationary vehicle detection module 120 with the video data.

Continuing with FIG. 5, in response to the current frame being the initial frame being processed, the stationary vehicle detection module 120 estimates vehicle occupancy in the parking area at a start of the sequence using the static image captured in the initial frame. Generally, the positions of the parked vehicles in the initial frame are determined to detect objects and/or vehicles that are already present in the parking area. More specifically, the module 120 defines the parking area and uses the defined parking area to determine the vehicles that are parked in the initial frame at S510. In one embodiment, the module 120 can receive input designating the parking area in the video data. The input can be used to define a virtual border (i.e., parking area boundary) using a process that is analogous to the process used for determining the parking space boundaries at S508, such as by mapping actual coordinates to pixel coordinates. The parking area boundary is output as coordinate data.

In one embodiment, the module 120 uses a training-based classifier to classify pixels in the initial frame as belonging to one of vehicles and non-vehicles at S510. The classified pixel information is used in conjunction with coordinate data to estimate occupancy. After the parked vehicles are determined, the background is initialized by setting the background as the initial frame. The background is used by the stationary vehicle detection module 120 to update a background in a current frame.

The stationary vehicle detection module 120 detects vehicles that park in the parking area or leave the parking area. Generally, the stationary vehicle detection module 120 highlights objects in the foreground, i.e., in the parking area of interest, of a video sequence when the image capture device is used to capture the video data. Once the background is estimated, the vehicles that park in the parking area or leave the parking area, after the initial frame, are detected by subtracting the selected frame from the estimated background and applying thresholding and morphological operations on the difference image. At each frame, the stationary vehicle detection module 120 detects movement of vehicles using temporal difference methods to check whether the detected vehicle is stationary or in motion. In the contemplated embodiment, a double-difference algorithm can also be used to detect objects in motion within the field of view of the camera.

With continued reference to FIG. 5, in one embodiment, the stationary vehicle detection module 120 computes an absolute difference in an intensity between pixels located in the current frame and pixels at corresponding locations in the background at S510. The difference between the current frame and the background is typically calculated only at positions where no motion is detected. The reason why the difference is calculated at only these positions is because motion resulting from possible occlusions and vehicular movement, such as, for example, due to a vehicle moving in and/or out of a space in a frame, might provide unreliable information regarding vehicle occupancy. The difference in intensity for each pixel at corresponding locations in the background and the current frame is then compared to a predetermined threshold at S512. In response to the difference not meeting the threshold (NO at S514), the pixel in the current frame is classified as constructing a background at S516. In response to the difference meeting the threshold (YES at S516), the pixel is classified as belonging to a foreground image at S518.

Figure 7A:
FIGS. 7A and 7B show foreground images that cause a vehicle and a non-vehicle/occlusion classification using occlusion detection process for detecting vehicles.
Figure 7B:

A verification module 122 can perform further processing on the foreground image to determine whether the foreground image pixels belong to one of a vehicle and a non-vehicle. When an object or a set of pixels, having a size that is reasonably large enough to be considered as a potential vehicle entering a scene is classified as a foreground change in the parking area, the verification module 122 applies an algorithm to determine if the detected object is actually a vehicle or a false detection. For example, FIG. 7A shows a foreground image that is detected as being inside the parking area while FIG. 7B shows a foreground image that is detected as being partially inside the parking area. The foreground image in FIG. 7B is actually an occlusion because the vehicle is captures partially in the parking area as it moves through the scene. Accordingly, in one embodiment, the processing can include occlusion detection for classifying images that cause a vehicle and a non-vehicle/occlusion. Occlusion can be detected in the current frame by computing an area of the foreground image that is partially detected in parking area. The area is used with the coordinate data (defining the parking area) to determine whether a majority of the detected image is inside or outside of the parking area. The select area is applied to a threshold at S520 to determine whether the foreground image is one of a vehicle and occlusion.

In another embodiment, the processing can alternatively or further include shadow suppression. When a classified foreground image includes a number of pixels that is large enough to be considered as a potential vehicle is detected (between frames), the image is processed as a foreground change in the parking area. Accordingly, a shadow suppression technique can be applied to the frame to eliminate portions of the foreground image that correspond to shadow areas. This operation can be performed by detecting shadow as including the regions having a chrominance that is similar to the background and a luminance that is substantially smaller than the background. The determined shadow is removed from the foreground image.

Further processes can be applied to confirm that the detected image is actually a vehicle or a false detection. In one embodiment, a confirmation can be performed using an algorithm for object recognition using Principal Component Analysis (PCA) or training-based processes. In a further embodiment, the processing can include morphological operations.

In another embodiment, the module 122 can alternatively determine whether the pixels belonging to the foreground image satisfy predetermined size thresholds. Furthermore, the module 122 can determine whether the features, such as location, color, and shape characteristics, of the foreground object substantially match the features of the vehicle. For these embodiments, the stationary vehicle detection module 122 can generate a binary image indicating the location of pixels associated with the foreground object. Using the binary image, the verification module 122 can analyze each object to determine if the object is in-fact a vehicle based on its size, position, and motion characteristics. In a further embodiment, the module 122 can determine whether no motion is detected in the frame. In yet another embodiment, the module 122 can perform a combination of the determinations. There is no limitation made herein directed toward the type of processing that can be performed for classifying the foreground pixels.

The verification module 122 determines whether the pixels belonging to the foreground image are contained within the bounds of the defined parking area at S520. In response to the foreground image being contained within the defined parking area or satisfying any of the above determinations (YES at S520), the pixels of the foreground image are classified as belonging to the vehicle at S522. In response to the foreground image being only partially contained in the parking area (NO at S520), the pixels of the foreground image are classified as belonging to a non-vehicle, such as, for example, an occlusion at S524.

With continued reference to FIG. 5, after the pixels in the selected frame are classified, the stationary vehicle detection module 120 forms a binary mask by assigning a "0" value to the pixels corresponding to locations classified as belonging to the background construct at S516 and a "1" value to pixels corresponding to locations classified as belonging to the vehicles in the foreground image at S528.

The stationary vehicle detection module 120 uses the assigned values to generate a binary image representing the pixel classification results for the current frame at S530. The binary mask can have the same pixel dimensions as the captured video. This binary information is used for calculating an algorithm, which is used to update the background in each next frame of the sequence to determine when the initially parked vehicle subsequently moves away from and/or leaves the parking space or when a new vehicle enters the scene. In this manner, the system updates and/or self-corrects for undetected or missed vehicles as soon as these vehicles leave the scene.

The binary image output at S530, frame-by-frame, is used to update the background for each next frame of the sequence. The background is defined as and/or includes buildings, roads, or any stationary objects that surround the parked vehicles in the captured video data. The background is determined in the current (i.e., select) frame of the sequence by applying an updating factor p (i.e., a learning factor) that is computed for each pixel of a preceding frame to an algorithm used to compute the background of the current frame. In other words, the first updating factor p used in an algorithm is based on the classification of pixels resulting from a comparison (i.e. background removal) between a select frame and the background. For each subsequent frame, the process for determining the updating factor p is repeated by comparing a current frame with the background of a preceding frame and then the algorithm is computed for determining the background of the current frame. A difference between the current frame and the background of the preceding frame is determined to detect the vehicles.

One aspect of the present disclosure is that the updating factor p varies depending on the classification assigned to the pixel at S516 and S518, as belonging to the foreground and background image (and hence the binary value assigned to the pixel at S526, and S528), in the selected frame. The binary mask is used as input for determining an updating factor p for each pixel at S532. The selection of the updating factor p is particularly suited for detecting vehicles that park in the parking area during the time period that the sequence of frames is captured. In one embodiment, the following criteria can be used to set the updating factor p for each pixel at each time instant. The updating factor p can be assigned a "0" value for a pixel indexed by (i, j) if the binary output indicated that a foreground image was captured in the preceding frame. In this manner, the updating factor p is "0" for any pixel belonging to a parked vehicle, a determined occlusion, or a detected movement.

Pixels belonging to the background construct at S516 do not get updated for corresponding locations in the sequence under these conditions. The updating factor p can be assigned a "1" value for a pixel indexed by (i, j) in frames that no longer include a previously stationary vehicle. In other words, the updating factor p is "1" when a parked vehicle has left the parking area. Accordingly, the background is recovered immediately by setting the updating factor to "1" for pixels at the location previously occupied by the vehicle. For all other pixels, the learning parameter is set to a value between zero and one ($0 \leq p \leq 1$) to update the background gradually. In one contemplated embodiment, the value can be set to 0.01.

One aspect of the disclosure is that the system applies the learning element to the updating factor p and uses the updating factor p as input when computing an algorithm used for background estimation at S534. In this algorithm, the background is initialized as the initial frame in the sequence of frames and gradually updates with each subsequent frame in the sequence. The algorithm is represented by the equation:

$$B_{t+1} = p*F_{t+1} + (1-p)*B_t$$

where $B_t$ represents the background at time t, such as a background in the initial frame or the preceding frame;
$F_{t+1}$ is the select frame at time t+1, such as the current frame; and,
$0 \leq p \leq 1$ is the image updating factor.

Based on the above-mentioned values for the updating factor p that are assigned to each pixel, if the updating factor p is "1" for all pixels in a frame, then the estimated background at any given time is equal to the preceding frame. In other words, by applying the updating factor p=1 in the algorithm, the output value is indicative of a change in vehicle positions in the current frame from that in the preceding frame. If the updating factor p is selected as "0", the background at time t+1 remains the same as the background at time t. In other words, by applying the updating factor p=0 in the algorithm, the output value is indicative that there is no change in vehicle positions in the current and the preceding frame. Accordingly, the updating factor p controls the updating rate of the background.

The system then determines whether the current frame is the last frame in the sequence at S536. In response to the current frame not being the last frame in the sequence (NO at S536), the method 500 returns to S504 to repeat on the next frame. In response to the current frame being the last frame in the sequence (YES at S536), the updating method ends at S538.

Figure 6:
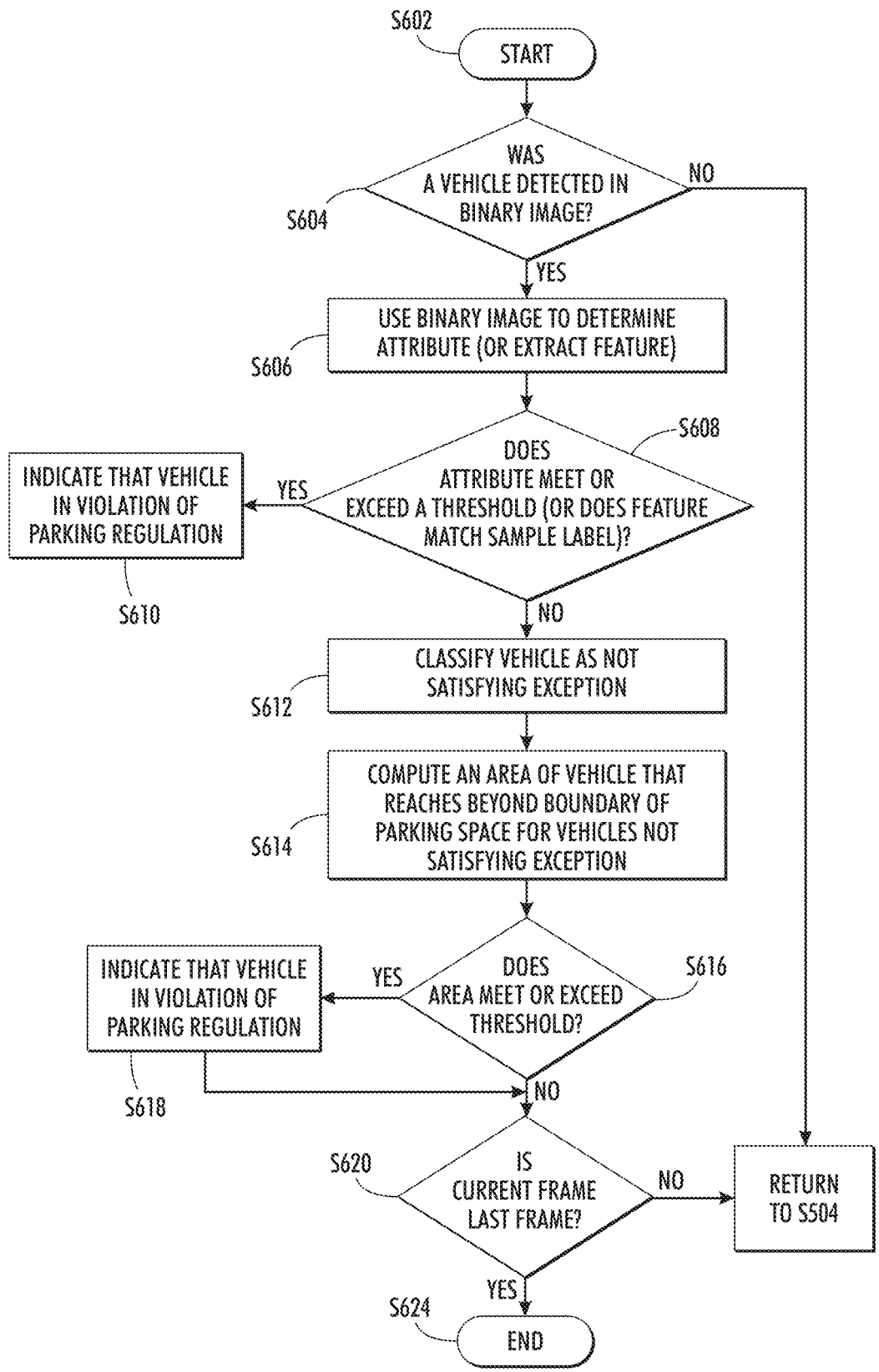
FIG. 6 is a flowchart describing a process for determining whether the detected vehicle is parked beyond the parking space boundary.

FIG. 6 is a flowchart describing a method 600 for determining whether the detected vehicle is parked beyond the parking space boundary. The stationary vehicle detection module 120 provides the vehicle classification module 124 with the binary image of the foreground image for classifying the vehicle. The classification can be implemented in many ways. The method starts at S602. Using the binary image, the vehicle classification module determines whether a vehicle was detected in the frame at S604. In response to no vehicle being detected (NO at S604), the method returns to S504 for analyzing the next frame. In response to a vehicle being detected (YES at S604), the binary image is used to determine an attribute or feature of the foreground (vehicle) image.

In one embodiment, a geometric attribute can be used as a basis for the classification. Example attributes can include an area, a length, a height, a width, an eccentricity, and a combination of the above, describing the binary image representing the detected parked vehicle in the parking area of the image plane.

Figure 8A:
FIGS. 8A and 8B show an image description of a process for classifying a vehicle based on an area of a binary image.
Figure 8B:
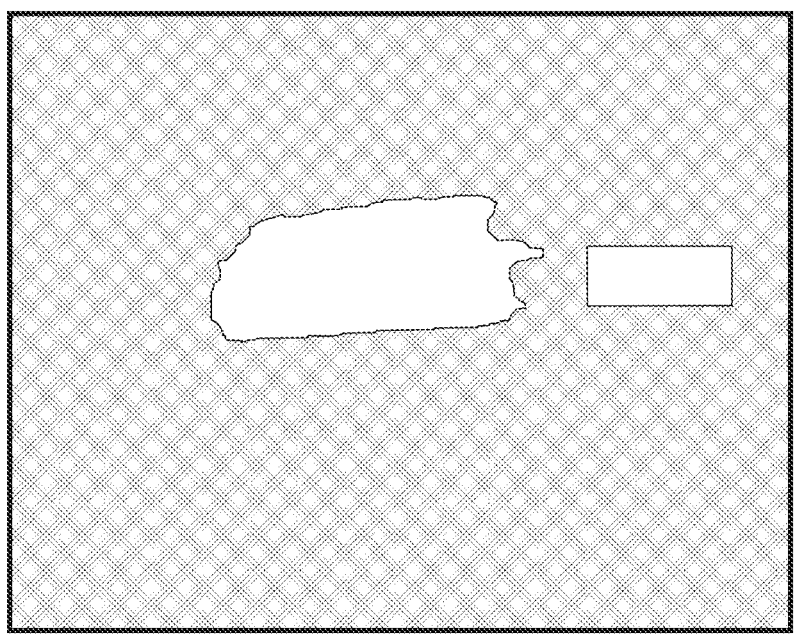

In one example embodiment, the selected attribute includes the area of the binary image. FIGS. 8A and 8B show an image description of a process for classifying a vehicle based on an area of a binary image. Using the binary mask, the area of the detected image S can be calculated as a sum of all the pixels in the image using the equation:

$$S = \Sigma_x \Sigma_y I(x,y)$$

where I is the frame-sized binary mask output from the preceding module; and x and y are the pixel coordinates of a pixel counted in the sum. As mentioned, the binary image I was formed from assigned "1" and "0" values. Therefore, the sum of the area is not impacted by the background construct that was classified as being the "0" values. The computed area is compared with a predetermined threshold value $T_1$ to distinguish the image between classifications at S608. The threshold depends on the specific configuration, geometry, and parameters (e.g. resolution) of the camera. This information can be input into the system 100 when the camera is installed and/or calibrated.

Figure 9:
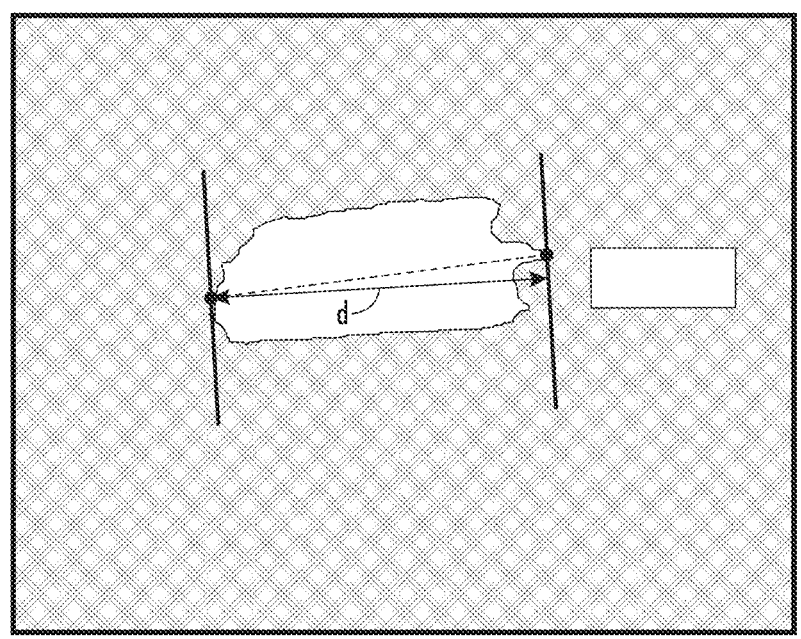
FIG. 9 shows an image description for classifying the vehicle by estimating the vehicle length.

In another example embodiment, the selected attribute estimated at S606 can include a physical length d of a detected vehicle. FIG. 9 shows an image description for classifying the vehicle by estimating the vehicle length. A calibration technique can be used to estimate the length. The classification module 124 can determine the start and end points of the detected binary image. The module 124 draws a first line (shown in phantom) connecting the start and end points. The module 124 determines the direction of traffic flow by analyzing the movement of vehicles through the series of frames. Using the traffic flow, the module 124 determines that the street extends in the same direction and estimates lines that extend perpendicular to this street direction. The lines that pass through the start and end points are determined on the image plane. The first line (phantom) that originally connected the start and end points is projected onto one of the lines perpendicular to the lines that pass through the start and end points. This projection is performed to compensate for any tilt, relative to the parking area, in the camera view. The corrected length is represented by the projected line (shown in solid). The actual length d of the vehicle is then estimated using the pixel length of the projected line by applying, for example, a calibration process, which maps pixel coordinates into actual coordinates.

The estimated length d is compared with a predefined threshold $T_2$ at S608. The threshold $T_2$ can be selected according to a length of the actual parking space length or a standard length of a parking space, which approximates 20 feet.

In a further example embodiment, selected features, such as edge and SIFT features, can be extracted from the image at S606. Alternatively, the extraction can be performed, for example, using a dimensionality reduction technique such as PCA/LDA. There is no limitation made herein to the process used for extraction. Alternatively, features can be extracted from the edges, corners and other regions of detected vehicles.

The extracted features of the current frame are compared to sample features at S608. More specifically, the vehicle classification module 124 can use, for example, a support vector machine (SVM) classifier for performing the classification. The classifier can be trained offline by using a set of features extracted from sample training images of different vehicles. The training images can include sample vehicles from multiple classes of vehicles. Features are extracted for each sample vehicle image and the set of features is labeled to train the classifier.

In a further example, the vehicle classification module 124 can represent the foreground image in a lower dimensional space using principal component analysis (PCA) or linear discriminant analysis (LDA) for the purpose of feature extraction. There is no limitation made herein to the process applied for determining the features used for the classification. The module 124 can then classify the representations using the classifier at S608.

Continuing at S608 in FIG. 6, the attribute (and/or feature) is compared to a respective threshold (and/or sample features) to determine a classification of the vehicle. In one embodiment, the vehicle can be classified as one of satisfying and not satisfying an exception to the regulation. For example, a vehicle can be classified by vehicle length for regulations that indicate that 'long' vehicles fall under an exception. More specifically, some vehicles, such as trucks and trailers, may be too long to fit in a single car space. Accordingly, the attribute that is determined at S606 can be used to compute whether the vehicle is too long. Because the area associated with a long vehicle is typically larger than an area of a shorter vehicle, such as a car, van, and SUV, on the image plane, the area calculated at S606 can be compared with (area) threshold $T_1$ to determine whether the vehicle is classified as a 'long' or 'short' vehicle at S608. Similarly, a calculated distance at S606 can be compared with the (length) threshold $T_2$ to classify the vehicle as being one of 'long' and short. In the same manner, the vehicle can be classified using the extracted features.

With continued reference to FIG. 6, in response to the attribute meeting and/or exceeding a threshold (or, alternatively, matching the features of the sample vehicles labeled as satisfying an exception in the training of the classifier) (YES at S608), the vehicle is classified as satisfying the exception at S610. In other words, the vehicle can be classified in one embodiment as being too long to fit in the parking space at S610. In response to the attribute not meeting and/or exceeding a threshold (or, alternatively, matching the features of sample vehicles labeled as not satisfying an exception in the training of the classifier) (NO at S608), the vehicle is classified as not satisfying the exception at S612. In other words, the vehicle can be classified in one embodiment as including a size (and length) that is small enough (and short enough) to fit in the parking space at S612. After the pixels in the selected frame are classified, the vehicle classification module 124 forms a binary mask by assigning a "0" value to the pixels corresponding to (e.g., long) vehicles belonging to the exception and a "1" value to pixels corresponding to (e.g., short) vehicles classified as not falling under the exception. The module 124 provides this binary output to the boundary violation detection module 126.

The boundary violation detection module 126 detects the vehicles that are parked beyond the boundaries of the parking space. Using the binary output, the module 126 more specifically analyzes each vehicle that does not satisfy the exception to determine whether the detected vehicle violates the parking boundary regulation. The module 126 calculates the area portion of the parked vehicle that reaches beyond the boundaries (determined at S508) at S614. This area is computed when the vehicle is stationary, thus indicating that the vehicle is primarily parked. The calculated area is compared to a predetermined threshold $T_3$ at S616. This threshold can be set, for example, according to relevant legislation. In response to the area exceeding the threshold (YES at S616), the module 126 indicates that a violation is detected at S618. The system can therefore transmit a signal to a user device, which can initiate enforcement of the parking boundary violation regulation. In response to the area not exceeding the threshold (NO at S616), the system determines whether the current frame is the last frame in the sequence at S620.

In response to the current frame not being the last frame in the sequence (NO at S620), the method returns to S504 and proceeds to process the next frame. In response to the current frame being the last frame in the sequence (YES at S620), the method ends at S624.

Although the methods 400, 500, 600 are illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for determining a parking boundary violation, the method comprising:
   receiving video data from a sequence of frames taken from an associated image capture device monitoring a parking area including at least a single parking space;
   determining a boundary defining at least one parking space in the parking area;
   detecting a presence of a vehicle in the parking area;
   determining an area that the detected vehicle reaches beyond the boundary of the at least one parking space;
   comparing the area to a predetermined threshold; and,
   in response to the area meeting or exceeding the predetermined threshold, indicating that the detected vehicle is in violation of the parking regulation.

2. The method of claim 1 further comprising:
   classifying the detected vehicle as one of satisfying and not satisfying an exception to the parking regulation.

3. The method of claim 2, wherein the classifying includes:
   determining an attribute of the detected vehicle;
   comparing the attribute to a predetermined threshold;
   in response to the attribute meeting and exceeding the threshold, classifying the detected vehicle as satisfying the exception; and,
   in response to the attribute not meeting and exceeding the threshold, classifying the detected vehicle as not satisfying the exception.

4. The method of claim 2, wherein the classifying includes:
   extracting at least one feature describing the detected vehicle;
   inputting the at least one feature into a classifier previously trained using labeled sample features;
   in response to the at least one feature matching the sample labeled features, classifying the detected vehicle based on the label.

5. The method of claim 1, wherein the determining whether the detected vehicle is violating the parking regulation includes:
   in response to the area not meeting or exceeding the predetermined threshold, proceeding to process a subsequent frame in the sequence.

6. The method of claim 1, wherein the detecting the vehicle includes:
   determining whether a current frame is an initial frame of the sequence;
   in response to the current frame being the initial frame, initializing a background image; and
   in response to the current frame not being the initial frame, updating a background in the current frame by applying a predetermined updating factor p in an algorithm used to determine the background, wherein the updating factor p varies for each pixel in the current frame and depends on a classification of the pixel as belonging to one of a foreground image and a background construct.

7. The method of claim 6, wherein the algorithm includes a function $$B_{t+1} = p*F_{t+1} + (1-p)*B_t,$$

wherein $B_t$ is the background at time t, $F_{t+1}$ is a frame at time t+1, and p is the updating factor for the pixel, wherein the updating factor is selected from a group consisting:
   a "0" value if a vehicle is detected at the pixel location;
   a "1" value if another object is detected at a pixel location previously occupied by a vehicle; and,
   a value $0 \leq p \leq 1$ for all other pixels.

8. The method of claim 1 further comprising:
   computing an absolute difference in an intensity between pixels located in a current frame and pixels at corresponding locations in one of a background image initialized in an initial frame and a background of a preceding frame;
   determining if the difference meets or exceeds a threshold; and,
   classifying the pixels in the select frame based on the difference and the threshold.

9. The method of claim 8, wherein the classifying the pixels includes:
   in response to the threshold not being met or exceeded, classifying a pixel as belonging to the background construct;
   in response to a threshold being met or exceeded, classifying the pixel as belonging to the foreground image.

10. The method of claim 8 further comprising:
    providing an image using the classified pixels, the providing including:
      assigning different values to the pixels corresponding to locations classified as belonging to background, and foreground; and,
    processing the image for determining whether the detected vehicle is violating the parking regulation.

11. The method of claim 1 further comprising:
    in response to determining that the detected vehicle is violating the parking regulation, providing notice of the violation to a user device.

12. A computer program product comprising tangible media which encodes instructions for performing the method of claim 1.

13. A system for determining parking availability comprising:
    a parking boundary determination device comprising memory which stores instructions for performing the method of claim 1 and a processor, in communication with the memory for executing the instructions.

14. A system for determining a parking boundary violation, the system comprising:
    a parking boundary violation determination device, the determination device including:
    a video buffer module adapted for receiving video data from a sequence of frames taken from an associated image capture device monitoring a parking area including at least a single parking space;
    a boundary violation detection module adapted for determining a boundary defining at least one parking space in the parking area;
    a stationary vehicle detection module adapted for detecting a presence of a vehicle in the parking area;
    a boundary violation detection module adapted to:
    determine an area that the detected vehicle reaches beyond the boundary of the at least one parking space,
    compare the area to a predetermined threshold, and
    in response to the area meeting or exceeding the predetermined threshold, indicate that the detected vehicle is in violation of the parking regulation; and,
    a processor adapted to implement the modules.

15. The system according to claim 14 further comprising a vehicle classification module adapted for classifying the detected vehicle as one of satisfying and not satisfying an exception to the parking regulation.

16. The system according to claim 15, wherein the vehicle classification module is adapted to:
   determine an attribute of the detected vehicle;
   compare the attribute to a predetermined threshold;
   in response to the attribute meeting and exceeding the threshold, classify the detected vehicle as satisfying the exception; and,
   in response to the attribute not meeting and exceeding the threshold, classify the detected vehicle as not satisfying the exception.

17. The system according to claim 15, wherein the vehicle classification module is adapted to:
   extract at least one feature describing the detected vehicle;
   input the at least one feature into a classifier previously trained using sample labeled features;
   in response to the at least one feature matching the sample labeled features, classify the detected vehicle based on the label.

18. The system according to claim 14, wherein the boundary violation detection module is adapted to:
   in response to the area not meeting or exceeding the predetermined threshold, proceed to process a subsequent frame in the sequence.

19. The system according to claim 14, wherein the stationary vehicle detection module is adapted to:
   determine whether a current frame is an initial frame of the sequence;
   in response to the current frame being the initial frame, initialize a background image; and
   in response to the current frame not being the initial frame, update a background in the current frame by applying a predetermined updating factor p in an algorithm used to determine the background, wherein the updating factor p varies for each pixel in the current frame and depends on a classification of the pixel as belonging to one of a foreground image and a background construct.

20. The system according to claim 19, wherein the algorithm includes a function, $$B_{t+1} = p * F_{t+1} + (1-p) * B_t,$$

wherein $B_t$ is the background at time t, $F_{t+1}$ is a frame at time t+1, and p is the updating factor for the pixel, wherein the updating factor is selected from a group consisting:
   a "0" value if a vehicle is detected at the pixel location;
   a "1" value if another object is detected at a pixel location previously occupied by a vehicle; and,
   a value $0 \leq p \leq 1$ for all other pixels.

* * * * *